United States Patent [19]
Berger et al.

[11] Patent Number: 5,589,674
[45] Date of Patent: Dec. 31, 1996

[54] METAL-ENCAPSULATED, GAS-INSULATED SWITCHING INSTALLATION

[75] Inventors: Ernst Berger, Mellingen; Franz Heil, Baden-Rütihof; Herbert Schifko, Glattbrugg; Piero Tecchio, Oberrohrdorf, all of Switzerland

[73] Assignee: ABB Management AG, Baden, Switzerland

[21] Appl. No.: 412,926

[22] Filed: Mar. 29, 1995

[30] Foreign Application Priority Data

Apr. 19, 1994 [CH] Switzerland .................... 1218/94

[51] Int. Cl.⁶ .................... H02B 13/035; H01H 33/70
[52] U.S. Cl. .................... 218/71; 218/75; 361/604; 361/618; 361/621
[58] Field of Search .................... 218/1, 43–45, 218/55, 57–67, 68, 71, 75, 79; 361/604–621

[56] References Cited

U.S. PATENT DOCUMENTS

| | | | |
|---|---|---|---|
| 3,235,774 | 2/1966 | Frowein | 361/621 |
| 3,665,257 | 5/1972 | De Heus | 361/621 X |
| 3,787,604 | 1/1974 | Guaglione | 218/43 X |
| 4,004,118 | 1/1977 | Boersma et al. | 218/71 |
| 4,774,628 | 9/1988 | Diaferia et al. | 218/75 X |
| 4,973,806 | 11/1990 | Kirchesch | 218/84 |
| 5,134,542 | 7/1992 | Suzuyama et al. | 361/618 |

FOREIGN PATENT DOCUMENTS

| | | | |
|---|---|---|---|
| 1440652 | 4/1966 | France | H02B 5/06 |
| 2540058 | 3/1977 | Germany | H02B 13/02 |
| 3034021A1 | 3/1982 | Germany | H02B 11/16 |

*Primary Examiner*—J. R. Scott
*Attorney, Agent, or Firm*—Burns, Doane, Swecker & Mathis, L.L.P.

[57] ABSTRACT

A metal-encapsulated, gas-insulated switching installation is provided with at least one busbar system, the busbar system having an axis separation, and a circuit breaker, the circuit breaker being in the form of a pole and having a pole axis, the circuit breaker including at least one quenching chamber installed in a pole enclosure and at least one connection for the associated busbar system. The pole axis is arranged at a right angle to a surface of a foundation. The circuit breaker of the switching installation includes a modular circuit breaker pole. The modular circuit breaker pole includes an enclosure lower part having a first end and a second end, and at least one opening for connecting an isolator for a busbar system between the first end and the second end of the enclosure lower part, an enclosure upper part having a first end and a second end, at least one of the first end and the second end of the enclosure upper part being attachable to each of the first end and the second end of the enclosure lower part, and an enclosure cover attachable to at least one of the second end and the first end of the enclosure upper part. The enclosure lower part, the enclosure upper part, and the enclosure cover define at least part of a circuit breaker pole enclosure having a pole axis.

10 Claims, 4 Drawing Sheets

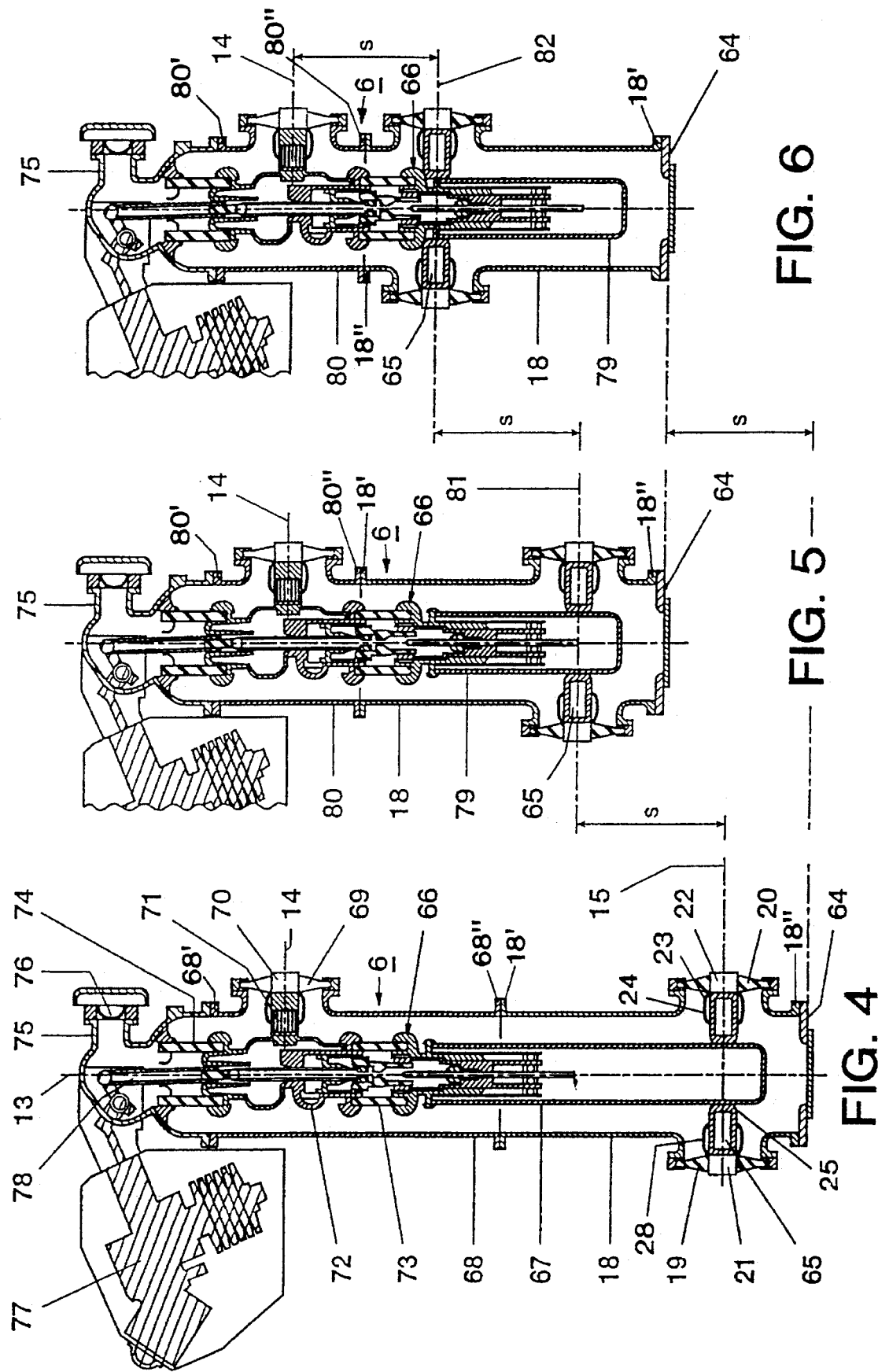

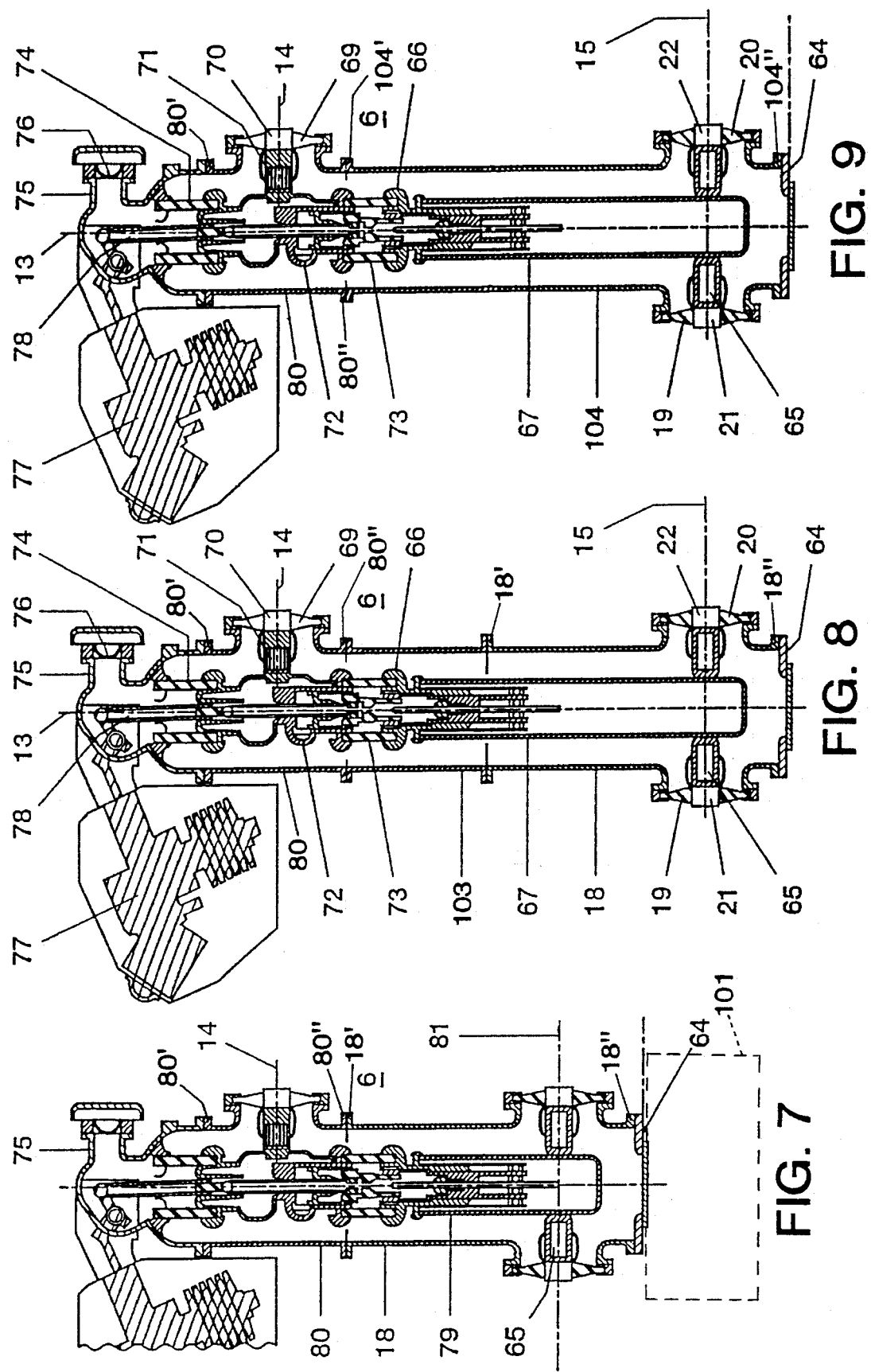

METAL-ENCAPSULATED, GAS-INSULATED SWITCHING INSTALLATION

BACKGROUND OF THE INVENTION

1. Field of the Invention

The invention is based on a metal-encapsulated, gas-insulated switching installation.

2. Discussion of Background

Single-phase, metal-encapsulated, gas-insulated switching installations having vertically positioned circuit breakers are known, which have a double busbar system. Such a switching installation is known, for example, from the specialist journal "E und M" [E and M], 102nd year, issue 7/8, page 305, FIG. 2. The pole axis of the circuit breakers is positioned vertically, and the circuit breakers are operated from below. The pole axes lie in a plane. The busbar systems have busbar axes which lie in planes which extend parallel to the foundation surface and vertically with respect to the plane in which the pole axes lie. A complex metal-encapsulated connecting piece leads from each circuit breaker pole to the associated busbars. These connecting pieces are of different length for each phase. A busbar isolator is provided between each of the busbars and that end of the respective connecting piece which faces the busbars. That end of the respective connecting piece which faces the busbars can be grounded by means of a grounding switch. The outlets and inlets all leave the circuit breaker at a specific height. The connecting pieces are likewise all connected to the circuit breaker in the same plane, which is parallel to the foundation surface. The pole enclosures of the circuit breaker are accordingly all constructed identically.

Such a metal-encapsulated, gas-insulated switching installation requires a comparatively large amount of space, because of the predetermined geometry. The connecting pieces to the busbars increase the cost of the switching installation.

SUMMARY OF TEE INVENTION

Accordingly, one object of the invention, as it is characterized in the independent claims, is to provide a novel metal-encapsulated, gas-insulated switching installation which can be constructed using simple means such that it has a considerably smaller space requirement.

The advantages which are achieved by the invention can be seen in the fact that the connecting enclosures which are required in the case of conventional gas-insulated switching installations and bridge the different separations between the circuit breaker poles and the busbars are no longer required. As a result of the absence of these connecting enclosures, denser packing of the apparatuses installed in the gas-insulated switching installation becomes possible.

This metal-encapsulated, gas-insulated switching installation is provided with at least one busbar system which has an axis separation s, furthermore with a circuit breaker which, per pole, in each case has one pole axis, at least one quenching chamber installed in a pole enclosure and at least one connection, located on a connecting axis for the respectively associated busbar, and whose pole axes are arranged at right angles to a foundation and lie in a first plane. In addition, the gas-insulated switching installation in each case has an electrically conductive connecting part which extends along the connecting axis and connects the at least one connection of the respective pole to at least one of the busbar systems and, furthermore, in each case has one isolator which is arranged between the at least one busbar and the pole. The busbar axes of the at least one busbar system run parallel to the foundation surface and lie in at least one further plane. The first plane in which the pole axes lie is arranged parallel to the at least one further plane, and the connections for the busbars lie on a diagonal.

It has been found to be particularly advantageous if two busbar systems are arranged respectively in a second plane and a third plane, and if the first plane, in which the pole axes lie, is arranged in the centre between the second plane and the third plane.

A particularly economical solution results if each connection is connected to a connecting part which extends along connecting axes which run at right angles to these planes, and if all these connecting parts have the same physical length.

In the case of this metal-encapsulated, gas-insulated switching installation, connections, which are arranged at different heights from pole to pole, are provided for the respectively associated busbar, and these differences are achieved solely by modifications in the construction of the poles without having to use separate and variable connecting parts.

Each of the pole enclosures of a three-pole circuit breaker is constructed from in each case one enclosure lower part, which is fitted with the connections, at least one enclosure upper part and an enclosure cover, the enclosure cover being installed in each of the pole enclosures as an identical part, and the enclosure lower part furthermore being installed at the bottom in each of the pole enclosures as an identical part, but not in the same installed position.

The invention, its development and the advantages which can be achieved thereby are explained in more detail in the following text, with reference to the drawing, which illustrates only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows a schematic illustration of the section 4—4 shown in FIG. 2, FIG. 5 shows a schematic illustration of the section 5—5 shown in FIG. 2, FIG. 6 shows a schematic illustration of the section 6—6 shown in FIG. 2.

FIG. 7 is a schematic view of an embodiment of a switching installation according to the present invention including a platform;

FIG. 8 is a schematic view of an embodiment of a switching installation according to the present invention including an intermediate ring portion; and FIG. 9 is a schematic view of an embodiment of a switching installation according to the present invention including an extended enclosure lower part.

Only those elements which are required for immediate understanding of the invention are illustrated.

DESCRIPTION OF THE PREFERRED EMBODIMENTS

Figure 1:
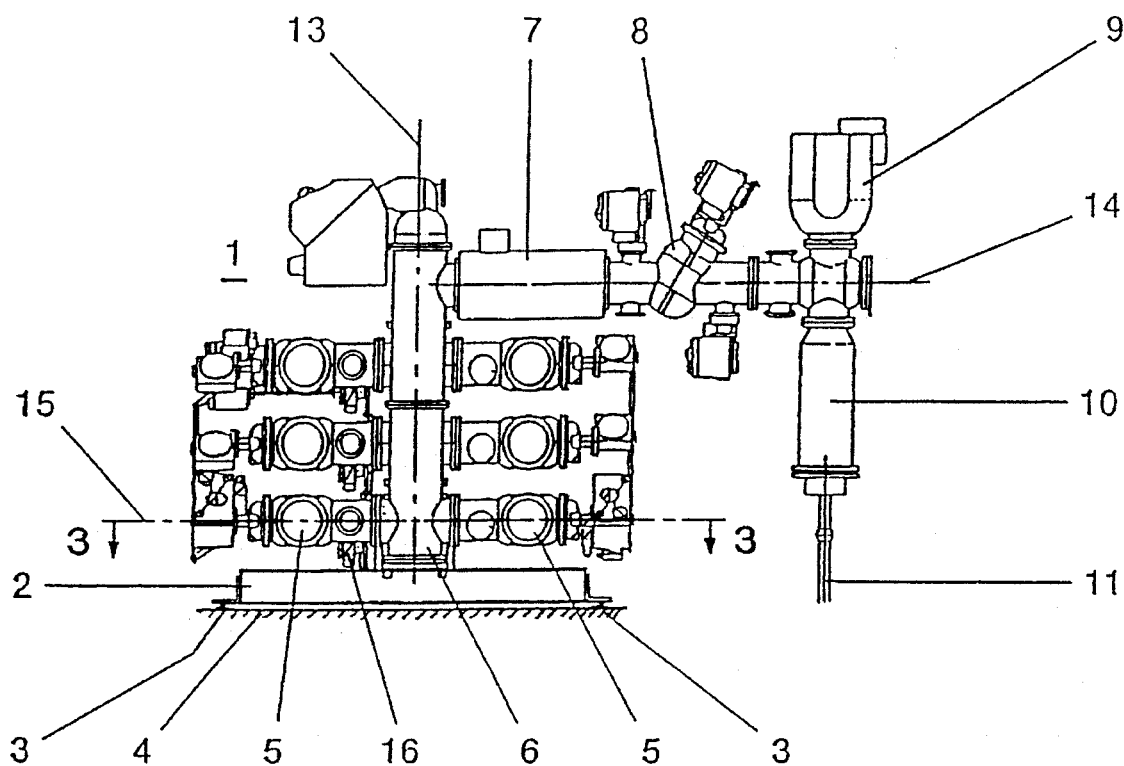
FIG. 1 shows a side view of an outlet panel of a gas-insulated switching installation.
Figure 2:
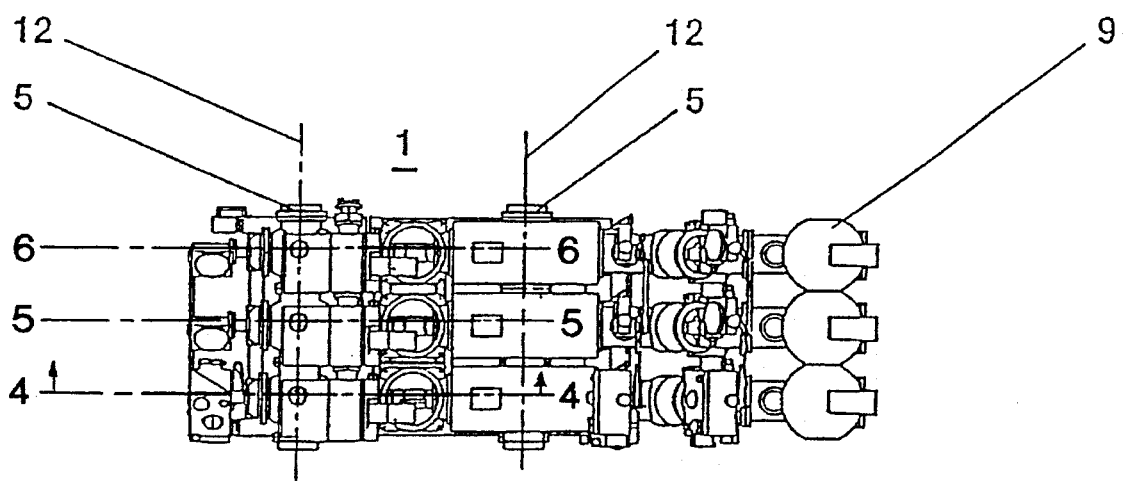
FIG. 2 shows a plan view of an outlet panel of a gas-insulated switching installation.

Referring now to the drawings, wherein like reference numerals designate identical or corresponding parts throughout the several views, FIG. 1 shows a schematically illustrated side view of an outlet panel 1 of a single-phase, metal-encapsulated, gas-insulated switching installation, and FIG. 2 shows a plan view of this outlet panel 1. This outlet panel 1 has a supporting frame 2 which is manufactured from a metal section. I-sections or tubular sections made of steel can be used, for example, as particularly suitable metal sections. As a rule, the tubular profiles have a round or a rectangular cross section. Angled sections 3, which are used for connecting the supporting frame 2 to a foundation 4, are fitted to the corners of the supporting frame 2. This connection can be constructed in a force-fitting manner, but it can also allow the supporting frame 2 to slide on a supporting rail which is incorporated in the foundation 4 and is not illustrated here. In the case of this type of metal-encapsulated and gas-insulated switching installation, the busbars 5 are arranged vertically one above the other on one side or on both sides of the vertically positioned poles of the circuit breaker 6. The outlet is provided with a current transformer 7, downstream of which an isolator 8 is connected, which carries out the function of outlet isolator. A grounding switch is provided on each of the two sides of the isolator 8. A voltage converter 9 is provided downstream of the isolator 8. A cable connection 10 connects the outgoing high-voltage cable 11 to the gas-insulated switching installation. A panel which is provided for an inlet is constructed in a similar manner to the described outlet panel 1.

The busbars 5 each have a busbar axis 12. The busbar axes 12 of each of the two busbar systems lie in a plane, vertically one above the other. The poles of the circuit breaker 6 each have a pole axis 13. The pole axes 13 of the three circuit breaker poles lie in a plane which is positioned vertically with respect to the foundation 4. The planes in which the busbar systems lie and the plane in which the pole axes 13 lie are arranged parallel to one another in this outlet panel 1. That part of the outlet panel 1 which leads away from the respective circuit breaker pole, the current transformer 7, the isolator 8 and the enclosure onto which the cable connection 10 is flange connected extend along a longitudinal axis 14. The longitudinal axis 14 is positioned vertically on the respective pole axis 13. That part of the outlet which leads away from the circuit breaker 6 can extend in the direction as illustrated in FIG. 1, but it can also extend in the opposite direction. The upper part of the pole enclosure, which is composed of the enclosure upper part and the enclosure cover, can be aligned in a corresponding manner during assembly. As a rule, a rotation through 180° about the pole axis 13 is carried out, but it is also possible to turn the upper part of the pole enclosure off through an angle in the region of 180°. Since the circuit breaker 6 is provided with a separate drive per pole, each of the poles can have differently aligned outlets.

In the case of a feed panel which is of similar construction to the outlet panel 1 and in which the inlet extends along the respective longitudinal axis 14, for example as fas as bushings which are connected to an overhead line, this option to rotate the upper part of the pole enclosure has a particularly advantageous effect since, in this way, sufficient phase separations for the insertion of the overhead line can easily be implemented even in switching installations having confined spatial conditions.

The connection from the respective circuit breaker pole to the busbars extends along a connecting axis 15. It can be seen from FIG. 1 that only one grounding switch 16 is provided per connection in the case of the outlet panel 1 which is equipped with a double busbar system. In the case of this gas-insulated switching installation, one of the two grounding switches which are normally required in this region is saved without any adverse effects on safety and without reducing the availability of the installation. In the case of a switching installation having a double busbar system, the grounding switch 16 can optionally be installed on either one side or the other side of the circuit breaker pole.

If the switch panel is constructed as a coupler panel, then the space provided for the grounding switch on one side of the circuit breaker pole is adequate to close the pole enclosure with a cover in a pressuretight manner, and there is still enough space for the busbar so that, even in a coupler panel, the busbar axis 12 can be maintained unchanged in comparison with the feed and outlet panels.

Figure 3:
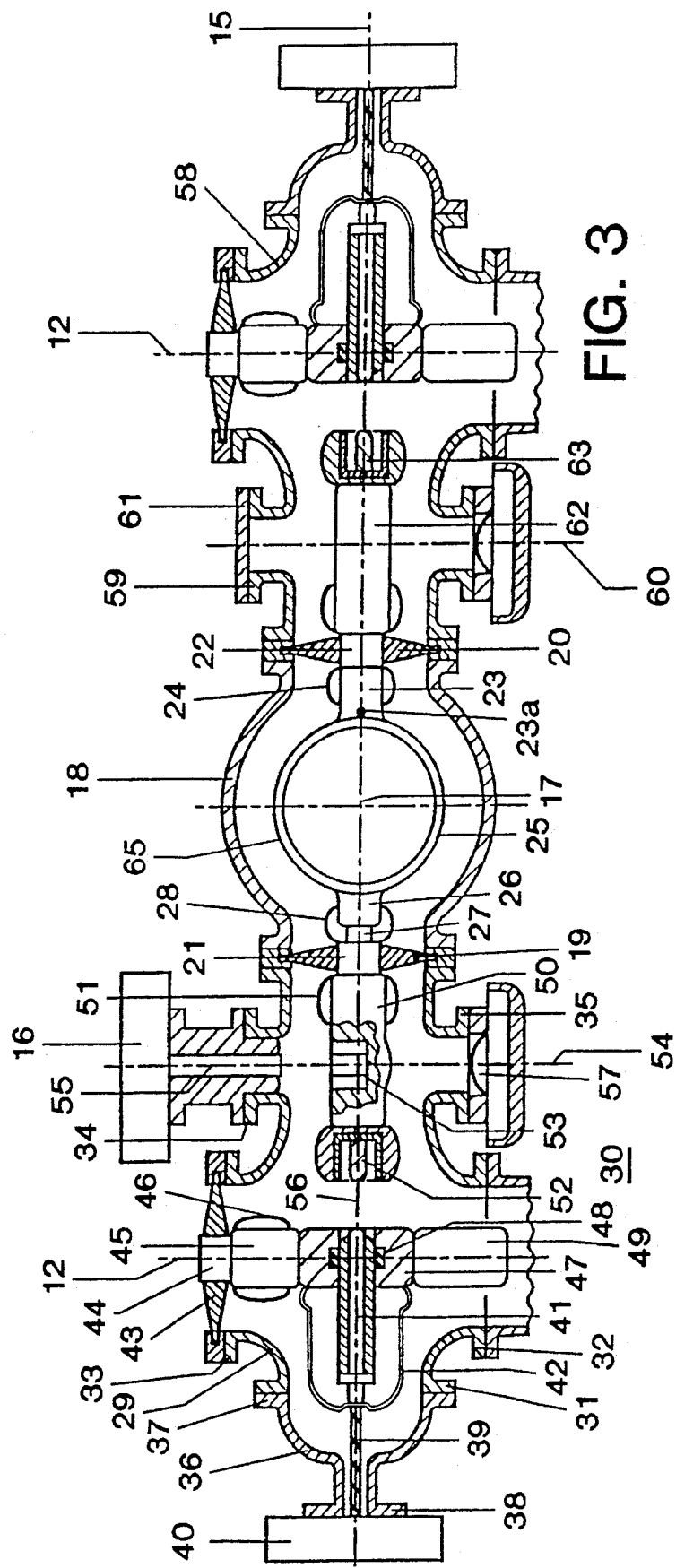
FIG. 3 shows a schematic illustration of the section 3—3 shown in FIG. 1.

FIG. 3 shows a schematic illustration of the section 3—3 shown in FIG. 1. The pole axis 13 is positioned vertically on the plane of the section and passed through it at a central point 17. A cylindrically constructed enclosure lower part 18, which extends along the pole axis 13, is provided with two openings, which lie on the connecting axis 15 as the centre, are not shown, and are in each case flange-connected in a pressuretight manner to a compartment insulator 19, 20 which is of cylindrical construction and is in the form of a disc. The compartment insulator 19 has an electrical connection 21 which passes through it in the centre. The compartment insulator 20 has an electrical connection 22 which passes through it in the centre. An electrically conductive connecting piece 23, which is surrounded by a shield 24 designed in a dielectrically favorable manner, is screwed onto the electrical connection 22. The connecting piece 23 is firmly screwed to a contact ring 25 made of an electrically highly conductive metal. The connecting piece 23 and the contact ring 25 can also be constructed integrally. The contact ring 25 has a contact arrangement 26, which is screwed to it, on the side opposite the connecting piece 23. The electrical connection 21 is connected to a contact support 27 which is fitted, for example, with spiral contacts. The contact arrangement 26 encloses the contact support 27 and, with it, forms a detachable plug contact which is surrounded by a shield 28 which is designed in a dielectrically favorable manner.

The centre point of the contact ring 25 coincides with the central point 17. The cylindrically constructed inner surface of the contact ring 25 is provided with at least one groove, which is not illustrated and into which a plastic ring, which is not illustrated, is bonded. During installation of the quenching chamber, the plastic ring guides the electrically conductive exhaust enclosure of the same, which is fitted externally with elastic contact elements, for example with spiral contacts, which produce an electrical contact with the contact spring 25, and the elastic contact elements are thus prevented from being subjected to any asymmetrical mechanical stress. The inner opening of the contact ring 25 is completely closed by the exhaust enclosure, which is connected to the quenching chamber. The enclosure 29 of an isolator 30, which is constructed as an angled isolator, is flange-connected in a pressuretight manner on that side of the compartment insulator 19 which is opposite the contact support 27.

The enclosure 29, which is illustrated in simplified form, on the isolator 30 has a wall made of metal. As a rule, the enclosure 29 is cast from an aluminum alloy in a pressure-tight manner. Apart from the opening which is closed by the compartment insulator 19, the enclosure 29 has five further openings, which are not illustrated and are provided with flanges 31 to 35. In addition, the enclosure 29 has a longitudinal axis which coincides with the connecting axis 15. The opening which is provided with the flange 31 is provided during assembly of the isolator with a metallic cover 36, which has a flange 37 which is screwed in a gas-tight manner to the flange 31. A further flange 38 is fitted to the cover 36, opposite the flange 37. The flange 38 is used for the attachment of a pressure-resistant bushing for an insulating material rod 39 which can be moved, during a switching process of the isolator 30, in the direction of an operating axis which coincides with the connecting axis 15. Driven by an isolator drive 40 which is likewise connected to the flange 38, the insulating material rod 39 moves the moving contact arrangement 41, which is illustrated in highly schematic form, of the isolator 30. The moving contact arrangement 41 is surrounded by a dielectrically acting shield 42, through which the insulating material rod 39 passes.

A busbar enclosure, which is not illustrated, is flange-connected to the flange 32. A compartment insulator 43, through which an electrical connection 44 passes, is flange-connected to the flange 33. A conductor piece 45 is screwed onto the electrical connection 44 and is sheathed on the insulator side by a dielectrically acting shield 46. The conductor piece 45 extends along the busbar axis 12, which runs vertically with respect to the connecting axis 15. The conductor piece 45 is electrically conductively connected to a first stationary contact support 47 of the isolator 30. A sliding contact 48 is incorporated in the contact support 47 and is provided in order to transfer current from the moving contact arrangement 41 of the isolator 30 to the contact support 47. The sliding contact 48 is arranged concentrically with respect to the connecting axis 15 and is provided with contact fingers, with contact laminates, or with spiral contacts. The contact support 47 is arranged concentrically with respect to the connecting axis 15. The contact support 47 is at the same time constructed as part of the busbar active parts. Fitted on the side of the contact support 47 opposite the conductor piece 45 is a further conductor piece 49, which extends along the busbar axis 12 through the opening which is provided with the flange 32. The electrical connection 21 is electrically conductively connected to a second stationary contact support 50 of the isolator 30. That end of the contact support 50 which is on the insulator side is covered by a dielectrically acting shield 51. That end of the contact support 50 which faces the contact support 47 is provided with a mating contact 52, which is arranged concentrically with respect to the connecting axis 15, for the moving contact arrangement 41 of the isolator 30. The contact supports 47 and 50 are formed to be dielectrically favorable, any edges being designed to be chamfered. The electrical connections 44 and 21 are at high-voltage potential in operation and are insulated from the metal encapsulation of the gas-insulated switching installation.

In addition, a mating contact 53 is incorporated in the contact support 50, which mating contact 53 is constructed in the form of a tulip, is arranged concentrically with respect to an installation axis 54 and holds the contact pin 55 of the grounding switch 16 when said grounding switch 16 is closed. The installation axis 54 is positioned vertically on the connecting axis. When the isolator 30 is open, there is a separation 56 between the contact support 47 and the mating contact 52. This separation 56 corresponds to the isolating path of the isolator 30, which, in operation, withstands all the voltage loads which occur at this point as a result of operation.

During connection of the isolator 30, the moving contact arrangement 41 is moved along the connecting axis 15, towards the mating contact 52, by the insulating material rod 39, which is operated by the isolator drive 40. Pre-arcing, which may be caused by residual charges and/or by a voltage of the operating frequency which is present between the contact support 47 and the mating contact 52, between the moving contact arrangement 41 and the mating contact 52 is coped with without any problems by the isolator 30. The geometrical arrangement of the contact support 47 and the mating contact 52 can prevent any expansion of the pre-arcing arc towards the wall of the enclosure 29. The isolator drive 40 is designed such that it reliably moves the moving contact arrangement 41 into the intended connecting position in every possible operational case, thus ensuring that current is carried correctly via the rated current contacts which are provided for this purpose, but are not described in more detail. The opening of the isolator 30 likewise always takes place correctly.

In this case, the grounding switch 16 is installed in the opening which is provided with the flange 34. As an alternative, however, it could also be installed in the opening which is provided with the flange 35. For example, detectors for monitoring the gas-insulated switching installation or, as shown in FIG. 3, a bursting disk 57, which makes it possible for pressure to escape from the enclosure 29 in the vent of a defect, can be flange-connected in a pressuretight manner to the flange 35. The two flanges 34 and 35 have a common installation axis 54.

The enclosure 58, which is flange-connected on the other side of the enclosure lower part 18, corresponds with the enclosure 29 in terms of virtually all the built-in parts, just being arranged in the form of a mirror image with respect thereto, and no grounding switch is installed. The opening which is provided with a flange 59 and into which a grounding switch extending along an installation axis 60 could be installed is closed in a pressuretight manner by means of a cover 61. The mating contact of the grounding switch has also, likewise, not been installed. A contact support 62, which is fitted with a mating contact 63 of the isolator arranged on the right, is electrically conductively connected to the electrical connection 22 on the side facing away from the connecting piece 23. There is no need to instal a second grounding switch here, since the mating contact 63 and the contact support 62 are always, thanks to the electrically conductive contact ring 25, at the same potential as the contact support 50 and the mating contact 52, so that it is completely sufficient for these active parts to be reliably grounded, if required, jointly with the aid of the single grounding switch 16.

The isolator can be installed in any desired installation position which is specified by the installation concept of the metal-encapsulated, gas-insulated switching installation. The grounding switch 16 can likewise be operated independently of position, so that it does not produce any installation limitations either. The grounding switch 16 can be constructed both as a work-in-progress grounding switch and as a quick-reaction grounding switch. The assembly formed by the isolator 30 with the upstream grounding switch 16 is of very compact design and occupies a particularly small amount of space in the direction of the connecting axis 15, so that the switch panel can be designed with particularly small dimensions.

The open isolating path of the isolator is insulated in a very highly reliable manner by means of $SF_6$. The isolator has an optimum rated current carrying capacity in the closed state, a very high short-circuit carrying capacity, and surge-current resistance, Furthermore, it has a reliable switching capability with respect to small capacitive currents and, in addition, it copes with switching over in the case of an interruption-free busbar change.

The isolator 30 has separate contact systems for carrying the continuous current and for the actual switching process. The continuous-current contacts are designed to be simple and reliable, and have a minimal number of individual parts. The contact movement is carried out by means of an electrically driven isolator drive which is arranged outside the isolator enclosure which is filled with $SF_6$ gas, but the isolator can also be driven manually. Such a configuration simplifies the maintainance tasks in a very advantageous manner. The isolator is provided with a mechanically coupled position indicator and, furthermore, a sight glass can be provided for an endoscope for inspecting the position of the contacts.

FIG. 4 shows a highly simplified schematic illustration of the section 4—4, shown in FIG. 2, through a first pole of the circuit breaker 6. This pole has a metallic pole enclosure which is filled with insulating gas and is composed of a plurality of components which are connected to each other in a pressuretight manner. The pole enclosure has an enclosure lower part 18, which is closed at the bottom by a cover flange 64, is of identical construction for all three poles of a three-pole circuit breaker 6, but is used in a different installed position. One contact-making assembly 65 is in each case installed in the enclosure lower part 18. This contact-making assembly 65 in each case comprises those parts described in conjunction with FIG. 3, such as the connecting piece 23 with the shield 24, the contact ring 25, the contact arrangement 26 and the contact support 27 with the shield 28. The contact-making assembly 65 is on the one hand connected in a plug-in manner to the electrical connection 21 of the compartment insulator 19 and, on the other hand, is firmly connected to the electrical connection 22 of the compartment insulator 20. The circuit breaker pole has a quenching chamber 66 which has a cylindrically constructed exhaust enclosure 67, which is made of metal, is arranged concentrically with respect to the pole axis 13, is moved into the contact-making assembly 65 and is electrically conductively connected to said contact-making assembly 65 via sliding contacts such as spiral contacts, for example. The exhaust enclosure 67 transfers the potential of the contact-making assembly 65 to the lower part of the quenching chamber 66 and, at the same time, carries the operating current when the circuit breaker pole is closed.

Fitted on the enclosure lower part 18 is an enclosure upper part 68, which has an opening which is closed in a pressuretight manner by a compartment insulator 69 and is not shown. The compartment insulator 69 has an electrical connection 70 which passes through it, on the one hand is electrically conductively connected to the active parts of the outlet which are not illustrated and extend in the direction of the longitudinal axis 14 and, on the other hand, is connected via a blade contact 71 to the upper part 72 of the quenching chamber 66. The upper part 72 and the lower part of the quenching chamber 66 are connecting by a quenching chamber insulator 73 to form a unit. When the circuit breaker pole is disconnected, the quenching chamber insulator 73 insulates the upper part 72 from the lower part. The quenching chamber 66 is connected by means of a holding insulator 74 to an enclosure cover 75, and is held in the centre of the pole enclosure by this enclosure cover 75. The enclosure cover 75 is connected to the enclosure upper part 68 and closes the pole enclosure at the top. The enclosure cover 75 is provided with a bursting disk 75 which, in an emergency, allows any overpressure occurring in the pole enclosure to escape to the environment. A drive 77 for the circuit breaker pole is flange-connected to the enclosure cover 75. The drive 77 does not sit on the pole axis 13 but is arranged alongside the pole enclosure, to be precise on that side of the pole enclosure which is opposite the outlet for the cable connection 10. The physical height of the circuit breaker pole is not increased, or is increased only insignificantly, by the drive 77. The drive 77 acts via schematically indicated force conversion on an insulating operating rod 78 which moves the moving contact parts of the quenching chamber 66 along the pole axis 13. During assembly, the quenching chamber 66, which is attached to the enclosure cover 75, is inserted from above into the pole enclosure such that the exhaust enclosure 67 makes correct contact with the contact-making assembly 65, and such that the blade contact 71 likewise electrically connects the active parts of the outlet reliably to the upper part 72 of the quenching chamber 66.

FIG. 5 shows a schematic illustration of the section 5—5 shown in FIG. 2 through a second circuit breaker pole. This circuit breaker pole likewise has a metallic pole enclosure which is filled with insulating gas and is composed of a plurality of components which are connected to one another in a pressuretight manner. In the case of this pole, the longitudinal axis 14 of the outlet is at the same level as in the case of the pole which has already been described. This pole enclosure has an enclosure lower part 18 which is closed at the bottom by a cover flange 64 and is of identical construction for all three poles of the three-pole circuit breaker 6. In this case, it is installed in the same installation position as in the pole according to FIG. 4. The same contact-making assembly 65 is installed here in the enclosure lower part 18. The contact-making assembly 65 produces the electrically conductive connection to an exhaust enclosure 79. The enclosure lower part 18 is connected to an enclosure upper part 80. The enclosure upper part 80 is designed to be shorter than the corresponding enclosure upper part 68 in FIG. 4, and the exhaust enclosure 79 is designed to be shorter than the corresponding exhaust enclosure 67 in FIG. 4, in each case by the same amount s. The amount s corresponds to the vertical axis separation between the busbars 5. The other components of the two switch poles of the circuit breaker 6 are of identical design.

The shortening of the said components by the amount s results in the circuit breaker pole according to FIG. 5 likewise being shorter by this amount s, and the busbar connection of this pole, which extends along a connecting axis 81, being offset upwards by the amount s with respect to the connecting axis 15.

FIG. 6 shows a schematic illustration of the section 6—6 shown in FIG. 2 through a third pole of the circuit breaker 6. This circuit breaker pole has a metallic pole enclosure which is filled with insulating gas and is composed of a plurality of components which are connected to one another in a pressuretight manner. In the case of this pole, the longitudinal axis 14 of the outlet is at the same level as in the case of the two poles already described. The pole enclosure has an enclosure lower part 18 which is closed at the bottom by a cover flange 64, is of precisely identical construction in the case of all three poles of the three-pole circuit breaker 6, but, in the case of this pole, is used rotated through 180° with respect to the installed position in the other two circuit breaker poles. A contact-making assembly 65 is in each case installed in the enclosure lower part 18. This pole is also shorter than the pole according to FIG. 4 by the amount s.

The rotation of the enclosure lower part 18 through an angle of 180° about an axis which runs parallel to the connecting axis 82 results in the busbar connection of this pole, which extends along a connecting axis 82, being offset upwards by twice the amount s with respect to the connecting axis 15, and likewise being offset upwards by this amount s with respect to the connecting axis 81. The connecting axis 82 is at a distance, which corresponds to the amount s, from the longitudinal axis 14, which is at the same level for all three circuit breaker poles.

As can be seen from FIG. 1, the pole according to FIG. 4 is mounted on the supporting frame 2. As seen in FIG. 7, the other two poles, which are both shorter by the amount s, are preferably mounted on a platform 101 which is connected to the supporting frame 2 and is so high that the said dimension difference is compensated for. The platform is welded together from iron sections, is highly cost-effective, and can be produced at little cost. Apart from the platform, the enclosure upper part 68 extended by the amount s and the exhaust enclosure 67 likewise extended by the amount s, no further modified components are necessary in order to render superfluous connecting pieces which are complicated and of different length and are always used in the case of a conventionally constructed metal-encapsulated, gas-insulated switching installation, between the circuit breaker poles and the busbars assigned to them.

In the case of the metal-encapsulated, gas-insulated switching installation according to the invention, the pole axes 13 are arranged in a plane. The pole axes 13 run vertically with respect to the foundation 4. The busbar axes 12 of a busbar system are likewise arranged in a plane vertically with respect to the foundation 4, but the busbar axes 12 run parallel to the surface of the foundation 4. If a gas-insulated switching installation having only one busbar system is produced, then this busbar system can optionally be arranged on one side or the other side of the plane of the pole axes 13 of the circuit breaker 6. For special applications, it is also possible to guide only one of the busbars of the system on the opposite side of the plane of the pole axes 13. If the gas-insulated switching installation is equipped with a double busbar system, then the busbar systems are, as a rule, arranged on both sides of the plane of the pole axes 13 of the circuit breaker 6, and with the same separation. As a result of this assignment of the busbars 5 in planes which are parallel to the pole axes 13 of the circuit breaker 6, a particularly space-saving arrangement of the busbar connections is possible, and they can be arranged on a diagonal.

A particularly compact arrangement of the gas-insulated switching installation results when the separation between adjacent busbar axes 12, which corresponds to the amount s, is selected to be of equal size to the separation between adjacent pole axes 13. The connecting line between the connecting axes 15, 81 and 82 is then at an angle of 45° with respect to the direction of the busbar axes 12. This arrangement of the connections results in increased flexibility in the design of metal-encapsulated, gas-insulated switching installations, and, in addition, an advantageous reduction in the number of components required for these gas-insulated switching installations.

The described changes to the physical length of the pole enclosure of the pole according to FIG. 4 can also be achieved in a different manner. Instead of the extended enclosure upper part 68, a shorter enclosure upper part 80 can be installed, for example, as is used in the other two poles, it then being necessary only to extend the enclosure lower part 104 (FIG. 9) in this pole to a corresponding extent upwards or to insert a correspondingly dimensioned intermediate ring 103 (FIG. 8) between the shorter enclosure upper part 80 and the enclosure lower part 18. As seen with reference to FIGS. 4–9, the circuit breaker 6 preferably includes an enclosure lower part 18 or 104, the enclosure lower part having a first end 18' or 104' and a second end 18" or 104" and at least one opening for connecting an isolator for a busbar system between the first end and the second end of the enclosure lower part. The circuit breaker 6 also includes an enclosure upper part 68 or 80 having a first end 68' or 80' and a second end 68" or 80", at least one of the first end and the second end of the enclosure upper part being attachable to either of the first end 18' or 104' and the second end 18" or 104" of the enclosure lower part 18 or 104. The circuit breaker 6 also includes an enclosure cover 75 attachable to either of the second end 68" or 80" and the first end 68' or 80' of the enclosure upper part 68 or 80. The enclosure lower part 18 or 104, the enclosure upper part 68 or 80, and the enclosure cover 75 define at least part of a circuit breaker pole enclosure having a pole axis, and a quenching chamber 66 is disposed inside of the pole enclosure and is electrically connectable to an isolator through the opening in the enclosure lower part. If desired or necessary, the intermediate ring 103 may be disposed between the enclosure lower part and the enclosure upper part to extend a length of the circuit breaker.

Obviously, numerous modifications and variations of the present invention are possible in the light of the above teachings. It is therefore to be understood that within the scope of the appended claims, the invention may be practiced otherwise than as specifically described herein.

What is claimed is:

1. A single-phase, metal-encapsulated, gas-insulated switching installation, the modular circuit breaker pole comprising:

a modular circuit breaker pole, the modular circuit breaker pole including an enclosure lower part having a first end and a second end, and at least one opening for connecting an isolator for a busbar system between the first end and the second end of the enclosure lower part, an enclosure upper part having a first end and a second end, at least one of the first end and the second end of the enclosure upper part being attachable to either of the first end and the second end of the enclosure lower part, an enclosure cover attachable to either of the second end and the first end of the enclosure upper part;

the enclosure lower part, the enclosure upper part, and the enclosure cover defining at least part of a circuit breaker pole enclosure having a pole axis, and a quenching chamber disposed inside of the pole enclosure and electrically connectable to the isolator through the opening in the enclosure lower part.

2. The single-phase, metal-encapsulated, gas-insulated switching installation as set forth in claim 1, wherein the pole axis lies in a first plane, the switching installation including a first and a second busbar system arranged, respectively, in a second and a third plane, the first plane being arranged centrally between the second and third planes, the first and second busbar systems being associated with first and second isolators, respectively, the enclosure lower pan having a first and a second opening at which first and the second isolators, respectively, are connected.

3. The single-phase, metal-encapsulated, gas-insulated switching installation as set forth in claim 2, wherein the first and second isolators extend from the first and second openings, respectively, at right angles to the pole axis, the first and second isolators being coaxial with respect to each other.

4. The single-phase, metal-encapsulated, gas-insulated switching installation as set forth in claim 2, comprising two or more modular circuit breaker poles, a first one of the circuit breaker poles having first and second openings in the enclosure lower part at a different position than a second one of the circuit breaker poles.

5. The single-phase, metal-encapsulated, gas-insulated switching installation as set forth in claim 1, wherein the opening is provided in the enclosure lower part in a position on the enclosure lower part such that, when the first end of the enclosure lower part is attached to either of the first end and the second end of the enclosure upper part in a first assembled arrangement, the opening is at a first distance from a position of the opening when the second end of the enclosure lower part is attached to either of the first end and the second end of the enclosure upper part in a second assembled arrangement.

6. The single-phase, metal-encapsulated, gas-insulated switching installation as set forth in claim 5, comprising three modular circuit breaker poles, a first end of the enclosure lower part being attached to either of the first end and the second end of the enclosure upper part on a first one of the poles, a second end of the enclosure lower part being attached to either of the first end and the second end of the enclosure upper part on a second one of the poles, and a third one of the poles being longer than the first and second ones of the poles by the first distance such that the opening in the enclosure lower part of the third one of the poles is disposed at the first distance from a closest opening of the first and the second ones of the poles.

7. The single-phase, metal-encapsulated, gas-insulated switching installation as set forth in claim 6, wherein the enclosure lower parts of the first, second, and third ones of the poles are the same, and the enclosure upper part of the third one of the poles is longer than the enclosure upper part of the first and second ones of the poles by the first distance.

8. The single-phase, metal-encapsulated, gas-insulated switching installation as set forth in claim 6, wherein the enclosure lower parts and the enclosure upper parts of the first, second, and thirds ones of the poles are the same, the third one of the poles including an intermediate part between the encosure lower part and the encosure upper part thereof to extend a length of the third one of the poles by the first distance.

9. The single-phase, metal-encapsulated, gas-insulated switching installation as set forth in claim 6, wherein the enclosure lower parts and the enclosure upper parts of the first and second poles are the same, the enclosure upper part of the third pole is shorter than the enclosure upper part of the first and second poles, and the enclosure lower part of the third pole is longer than the enclosure lower part of the first and second poles.

10. The single-phase, metal-encapsulated gas-insulated switching installation as set forth in claim 6, further comprising a supporting frame, the third pole being mounted on the supporting frame, the first and second poles being mounted on a common platform having a height equal to the first distance, the common platform being mounted on the supporting frame.

* * * * *